United States Patent Office 2,726,138
Patented Dec. 6, 1955

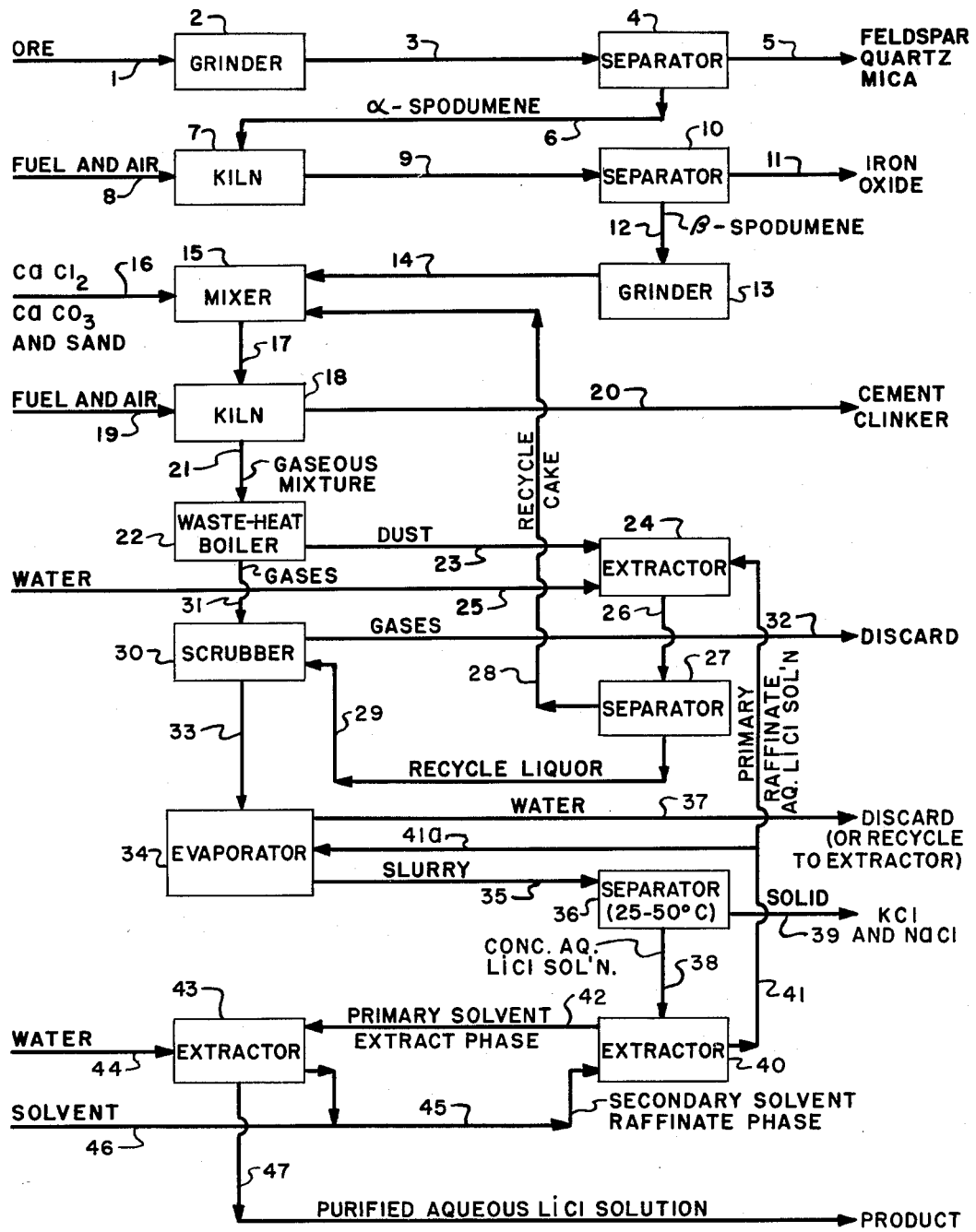

2,726,138

PREPARATION OF HIGH PURITY LITHIUM CHLORIDE FROM CRUDE AQUEOUS LITHIUM CHLORIDE

George L. Cunningham, Cincinnati, Ohio, assignor, by mesne assignments, to Chempatents, Inc., New York, N. Y., a corporation of Delaware Application December 6, 1952, Serial No. 324,549

18 Claims. (Cl. 23—31)

The present invention relates to a process for the preparation of high purity lithium chloride from crude aqueous lithium chloride solutions containing at least about 2% lithium chloride together with a substantial concentration of potassium chloride or sodium chloride or both, by concentrating this solution to about 40 to 44% lithium chloride, separating any precipitated solid therein at 25 to 50° C., extracting the resulting solution with an inert organic selective solvent for lithium chloride, and recovering from the extract phase the lithium chloride in a pure form; and more particularly, the invention relates to such a process wherein the aqueous lithium chloride solution is obtained by roasting lithium ore, preferably of 4 to 8% equivalent lithia content, with calcium carbonate and calcium chloride, whereby gaseous crude lithium chloride is evolved, and dissolving the water soluble constituents of the gaseous material in the aqueous raffinate resulting from the organic solvent extraction step.

This invention relates especially to such a process wherein pegmatite ore is coarsely ground, concentrated alpha-spodumene is separated therefrom and converted by roasting with fuel and air to beta-spodumene, optionally iron oxide may be magnetically separated therefrom, and then the beta-spodumene is ground, and roasted with sand, limestone, and calcium chloride to form Portland cement clinker as a solid by-product, and the gaseous mixture containing crude lithium chloride.

Lithium metal and lithium salts have attained a considerable commercial importance, and various methods have been proposed heretofore for the preparation of such salts and also the metal.

In one method, the ore is roasted in the presence of calcium carbonate, and then leached with water, and the resulting crude lithium carbonate solution is converted to lithium chloride by treatment with hydrochloric acid and this chloride is recovered, after intermediate purification steps.

The heretofore suggested processes for extraction of lithium chloride from crude mixtures thereof containing other alkali metal chlorides, have been regarded as commercially unattractive inasmuch as they required evaporating the chlorides virtually to dryness before the extraction step. Such an evaporation step is extremely difficult in view of the bumping and spattering of the solution as it becomes very concentrated, as well as the tendency of the salts to adhere tightly to the walls of the evaporation vessel.

For many purposes, the lithium metal or lithium salts should be of very high purity, and in the case of the metal the content of sodium or potassium or both should be very low. The art is confronted with the problem of providing relatively high purity lithium metal and lithium salts, especially the chloride, in an economic manner.

It has been found in accordance with the invention that high purity lithium chloride may be obtained in an advantageous manner from an aqueous chloride solution containing 2% or more lithium chloride together with a substantial concentration of sodium chloride or potassium chloride or both, by concentrating the solution to about 40 to 44% by weight lithium chloride concentration, cooling to 25 to 50° C. and separating any resulting solid alkali metal chloride therefrom, and contacting the resulting solution with an inert water insoluble polar organic selective solvent for the initial lithium chloride, separating the extract phase and recovering therefrom high purity lithium chloride.

This process may be combined with a process for making Portland cement clinker from spodumene ore, in which combination, the ore is intimately mixed and roasted together with sand, limestone, and calcium chloride at a temperature of about 1100 to 1200° C. to form by-product cement clinker and evolve crude gaseous lithium chloride containing at least one other alkali metal chloride. The crude chlorides are recovered from the gaseous mixture by leaching with water or with the aqueous raffinate resulting from the organic solvent extraction step, and the resulting chloride solution is the initial lithium chloride solution referred to hereinabove.

The invention is diagrammatically illustrated in the attached drawing.

The objects achieved in accordance with the invention, as described herein, include the provision of a process for preparing high purity lithium chloride from a crude aqueous chloride solution containing 2% or more lithium chloride together with a substantial concentration of potassium chloride or sodium chloride or both; the provision of such a process wherein the solution is concentrated to 40 to 44% lithium chloride, any precipitated solid material therein is separated at 25 to 50° C., and the resulting solution is extracted with an inert water insoluble polar organic selective solvent for lithium chloride, and high purity lithium chloride is separated from the extract phase; the provision of such a process wherein the initial crude chloride solution is obtained by roasting lithium ore with calcium chloride and evolving therefrom gaseous alkali metal chlorides, and absorbing the alkali metal salts from this gaseous material in water or in the aqueous raffinate resulting from the organic solvent extraction step; the provision of a process of the latter type wherein spodumene is the ore and it is roasted together with added sand and calcium carbonate, and Portland cement clinker is formed as a by-product; and other objects which will be apparent as details or embodiments of the invention are set forth hereinafter.

In order to facilitate a clear understanding of the invention, the following preferred specific embodiments are described in detail:

*Example 1*

In a suitable vessel having a corrosion resistant inner surface, such as of glass or metal, preferably equipped with an agitator and indirect jacket heating means, there is placed a crude aqueous chloride solution containing:

19 parts by weight lithium chloride
3 parts sodium chloride
3.2 parts potassium chloride, and
100 parts of water This solution is evaporated until it contains about 40% lithium chloride, then cooled to about 25° C., and filtered to remove the solid sodium and potassium chlorides. The resulting filtrate contains about 40% lithium chloride and about 1.5% of sodium and potassium chlorides. This solution is passed downward through an extraction tower countercurrent to an upward current of n-butanol at 25° C. The aqueous raffinate lithium chloride solution which passes from the bottom of the tower contains about 30% lithium chloride, and substantially all of the sodium and potassium chlorides of the aqueous feed to the tower. This aqueous solution may be reprocessed by concentrating to 40% lithium chloride, filtering to remove any solid sodium and potassium chlorides therein, and then reprocessing in the extraction tower, as above.

The n-butanol extract phase contains about 11 grams of lithium chloride per 100 cc. of solution, and it is passed upwardly through an extraction tower countercurrent to a descending stream or current of pure water, at 25° C. The secondary aqueous extract phase which passes from the bottom of the second tower contains about 25% lithium chloride, and only about 0.1% sodium and potassium chlorides, based on the weight of the lithium chloride. The secondary raffinate and n-butanol phase which passes from the top of the second tower is practically free of lithium chloride, and is reused in the first tower to extract additional lithium chloride.

The secondary aqueous extract phase is steam or vacuum stripped to remove and recover any small amount of n-butanol therein, and then is evaporated to dryness to recover the high purity lithium chloride as a solid. Alternately, the secondary extract phase may be further extracted in a countercurrent manner with benzene to extract therefrom the n-butanol, before recovering the solid lithium chloride therefrom. The benzene solution of n-butanol may be contacted with the concentrated aqueous lithium chloride solution, prior to the above mentioned first extraction, to remove the butanol from the benzene, and reuse it in the process.

Referring to the accompanying drawing, the ore is passed through line 1 into grinder 2 wherein it is coarsely ground, and then passed through line 3 to separator 4, wherefrom feldspar, quartz, mica, and the like, are removed through line 5, and the concentrated alpha-spodumene is passed therefrom through line 6 to kiln 7 wherein it is converted by heating at a temperature of 900 to 1100° C. with fuel and air introduced through line 8, to convert it to the beta-spodumene form and then passed through line 9 to magnetic separator 10 wherefrom the iron oxide is removed through line 11 and the remaining material is passed through line 12 to grinder 13, wherein it is finely ground and then passed through line 14 to mixer 15.

It is mixed therein with sand, limestone, and calcium chloride (as 40% aqueous solution), the latter ingredients being introduced through line 16. Separated solid or filter cake may be recycled thereto through line 28. The resulting mixture is passed through line 17 to kiln 18 wherein it is roasted at a temperature of 1100 to 1200° C. with fuel and air introduced through line 19.

The resulting by-product Portland cement clinker is removed therefrom through line 20, and the gaseous mixture evolved is passed therefrom through line 21 to the waste heat boiler 22, and the dust precipitated therein is passed therefrom through line 23 to extractor 24 wherein it is contacted with water introduced through line 25 or recycled primary raffinate aqueous lithium chloride solution introduced through line 41, or both, and the resulting mixture is passed through line 26 to separator 27 (filter or wringer), wherein the solid is separated therefrom and recycled through line 28 to mixer 15. The filtrate or liquor therefrom is passed through line 29 to scrubber 30 wherein it is contacted with gases passed from the waste heat boiler through line 31, and the scrubbed gases are discarded therefrom through line 32.

The resulting chloride solution is passed through line 33 to evaporator 34 wherein water is evaporated off through line 37 (this water may be discarded, or recycled to extractor 24; connection not shown). The resulting slurry or solution is passed through line 35 to separator 36 (filter or wringer) wherein any solid sodium and potassium chlorides are separated at 25 to 50° C. and removed through line 39. The resulting concentrated aqueous lithium chloride solution is passed through line 38 to extractor 40 wherein it is contacted, preferably in a countercurrent manner, with the organic selective solvent for lithium chloride. The primary organic liquid extract phase is separated and passed therefrom through line 42 to extractor 43, wherein it is contacted with substantially pure water introduced through line 44, preferably in a countercurrent manner. The secondary solvent raffinate phase is removed therefrom and passed through line 45 back to extractor 40, wherein the solvent is reused for extraction of additional lithium chloride. Additional solvent may be added thereto through line 46. The secondary aqueous extract phase is removed through line 47, and it contains the purified aqueous lithium chloride solution substantially free of inorganic impurities. This solution may be given a steam or vacuum stripping treatment to remove any dissolved solvent therein, if desired, or alternately an extraction treatment with benzene or the like material to remove any lithium chloride organic solvent therein, as described hereinabove.

For commercial purposes, it is preferred to operate the process in this continuous manner, recovering substantially all the lithium of the ore as high purity lithium chloride product, and also recovering sodium and potassium chlorides substantially free of lithium salts; and additionally recovering valuable cement clinker.

The aqueous lithium chloride solution product may be used as such, or may be evaporated to dryness to recover the lithium chloride in solid form. This chloride is particularly suitable for preparation of lithium metal, e. g. by known electrolytic methods.

*Example 2*

In this example, the procedure of Example 1 is combined with a process for preparing high grade Portland cement clinker from pegmatite ores containing spodumene.

A typical pegmatite ore taken from Kings Mountain, North Carolina, has the following composition in weight percent:

32–36% feldspar
28–34% quartz
26–32% spodumene
4–6% mica
.03% casserite (tin ore)
.01–.03% beryl and these materials have the following average analyses:

|  | Spodumene | Feldspar | Quartz | Mica | Composite |
|---|---|---|---|---|---|
| SiO$_2$ | 61.29 | 65.2 | 98.5 | 61.9 | 84.00 |
| Al$_2$O$_3$ | 30.85 | 22.6 | .4 | 31.1 | 15.02 |
| Fe$_2$O$_3$ | .20 | .07 | .05 | .3 | .09 |
| CaO | .38 | .42 |  | .2 | .26 |
| MgO | .26 | .18 |  | .2 | .07 |
| Li$_2$O | 6.84 | .32 |  | .4 | 1.92 |
| Na$_2$O | .61 | 6.51 |  | .62 | 2.43 |
| K$_2$O | .82 | 4.32 |  | 6.10 | 1.92 |

This ore is coarsely ground to a particle size of 1 to 2″ (maximum diameter) and then the concentrated spodumene is separated therefrom, e. g. by a sink and float separation procedure. The specific gravities of the pegmatite ore constituents are as follows:

Quartz _____ 2.65 to 2.66
Beryl _____ 2.68 to 2.76
Feldspar _____ 2.70
Mica _____ 2.80 to 2.90
Spodumene _____ 3.1 to 3.2
Casserite _____ 6.8 to 7.0 and the first four may be separated therefrom by mixing with an aqueous ferrosilicon slurry having a floating density of about 2.90, and floating these materials off from the spodumene and casserite which settle to the bottom. By this procedure the average lithium content of the concentrate is about three times that of the crude ore, and therefore the use of such a concentrate markedly increases the lithium salt output per roasting step. It also increases the yield of lithium salt relative to the amount of calcium chloride used.

The spodumene in this concentrate is in the hard alpha form, and this is heated to a temperature of 900 to 1100° C. until it is converted to the softer beta form, e. g. by roasting in a usual kiln with powdered coal and air.

The resulting crude beta-spodumene may be passed through a magnetic separator, whereby any iron oxide present is removed, if a white type of cement clinker is desired. It may also be subjected to a light grinding operation to eliminate lumps, and this may precede the iron oxide separation step.

The resulting beta-spodumene is mixed with sand, calcium carbonate, and calcium chloride. The sand and calcium carbonate, e. g. well ground limestone, are added to modify the composition of the ore residue to provide a good grade of Portland cement clinker, and the calcium carbonate assists in maintaining the reaction mixture in a porous state and in preventing the adherence thereof to the kiln walls. It is preferred to thoroughly mix these ingredients prior to roasting in order to achieve good contact therebetween; this mixing may be by means of a wet grinding operation. The resulting mixture having the following composition:

100 parts beta-spodumene
64 parts sand
590 parts limestone, and
29.5 parts calcium chloride (as 40% aqueous solution)

is passed through a rotary cement kiln at about 1100 to 1200° C. Higher temperatures which melt the mix should be avoided since they cause it to be less porous and thus less reactive; and lower temperatures, though operative, are less desirable inasmuch as they may not give complete reaction and volatilization of the lithium component. Theoretically, the gaseous material evolved thereby should contain:

19 parts lithium chloride
1.3 parts sodium chloride, and
1.0 part potassium chloride;

in actual operation the recovery is about 90–95% of these amounts.

The by-product Portland cement clinker obtained by this process has the following composition:

| | Percent |
|---|---|
| $SiO_2$ | 25.00 |
| $Al_2O_3$ | 6.22 |
| CaO | 66.60 |
| $Fe_2O_3$ | .044 |
| MgO | [1]1.03 |

[1] Neglecting MgO in limestone.

and this is a high grade cement clinker having a low magnesium and low iron content. It is converted to pulverulent cement in the usual manner.

The gaseous mixture passed off from the discharge end of the kiln is preferably passed through a heat exchanger such as a waste heat boiler, to recover as much heat as possible for other uses, e. g. in the form of steam. In this step, the dust settles out of the gaseous stream, and contains a major proportion of the volatilized alkali metal chlorides of the gaseous mixture. This dust is mixed and agitated with water or the mother liquor from the potassium chloride recovery step of Example 1, and substantially all the soluble chlorides in the dust are dissolved thereby. Sufficient water is used to keep the slurry in fluid form and prevent the formation of lumps, to avoid trapping or occluding substantial amounts of the alkali metal chlorides. This slurry is filtered or centrifuged, and the separated solid or filter cake is recycled to the cement kiln, or introduced therein with the next batch. Thus, ultimately the entire alkali metal chloride content of the dust is recovered as the chloride.

Alternatively, the precipitated dust may be recycled directly to the cement kiln for reprocessing, thereby eliminating ultimate loss of the alkali metal chlorides therein.

After passing through the heat exchanger, the gaseous mixture is contacted with water, or the filtrate or mother liquor from the dust leaching step to recover any alkali metal salts therein; and the residual gas is discarded; preferably, this is carried out in a countercurrent manner in a spray tower.

Alternatively, the gaseous mixture may be separated into its solid and its gas constituents by means of a Cottrell precipitator, before or after passing through the heat exchanger; or, instead of passing through the heat exchanger. The gas may be scrubbed, or discarded, and alkali metal chlorides are recovered from the solids, as described hereinabove.

*Example 3*

The procedure of Example 2 is repeated, except that the pegmatite ore is ground and processed directly in the cement kiln, the ore being mixed with amounts of sand, calcium carbonate, and calcium chloride (e. g. as 40% aqueous solution) to provide a cement clinker having substantially the composition of that of Example 2, and this is a high grade cement clinker having a low magnesium content.

During the roasting operation, the alkali metals present are converted to their chlorides, which are evolved in gaseous form. The calcium added as calcium chloride is converted to the oxide, which remains in the cement clinker. The limestone is converted to calcium oxide and carbon dioxide, and calcium aluminates, silicates and alumino-silicates are also formed.

*Example 4*

The procedure of Example 1 is repeated, except that i-butanol is used as the solvent; and the primary alcoholic extract phase contains about 8.3% lithium chloride.

*Example 5*

The procedure of Example 1 is repeated, except that n-pentanol is used as the solvent; and the primary alcoholic extract phase contains about 7.8% lithium chloride.

*Example 6*

The procedure of Example 1 is repeated, except that i-pentanol is used as the solvent; and the primary alcoholic extract phase contains about 8.1% lithium chloride.

Comparable results to the foregoing are obtained with various modifications, such as the following. The ore used may be any ore which contains an appreciable lithium content, e. g.

| Mineral | Lithia content, in percent by weight |
|---|---|
| Spodumene | 4–8 |
| Lepidolite | 2–4 |
| Amblygonite | 8–9 |
| Triphylite | 2–6 |
| Petalite | 2–4 |
| Zinnwaldite | 2–3 |

The lithium content thereof may be converted to lithium chloride by roasting with calcium chloride, and the desired chloride evolved therefrom in gaseous form together with any other alkali metal chloride present.

The fuel may be coal, or oil or natural gas, and the like, and the air may be enriched with oxygen.

The crude aqueous lithium chloride solution contains from about 2 to about 44% lithium chloride, together with a substantial concentration of sodium chloride or potassium chloride or both. It is concentrated to 40 to 44% lithium chloride, separating any precipitated sodium or potassium chlorides at 25 to 50° C. If the solution contains a very large proportion of sodium and potassium chlorides, the evaporation and filtration may be carried out in a series of steps or sequences so as to avoid thick or viscous solutions.

The extraction of the concentrated aqueous lithium chloride solution is carried out with an inert relatively water insoluble polar organic compound containing 3 to 8 carbon atoms and at least 1 nitrogen or oxygen atom in the molecule, such as the alcohols of 3 to 8 carbon atoms, the corresponding ketones and aldehydes, pyridine, quinoline, and the like. The normal or iso-alcohols are preferred; and operationally, n-butanol and i-butanol form a distinctly superior class of solvents for the present purposes.

The solvent extraction steps may be carried out at 25 to 50° C., and at ordinary pressures; however, higher or lower temperatures to keep the system liquid may be used. The process may be carried out in a batch, intermittent, or continuous manner. If desired, the lithium chloride may be recovered from the primary liquid solvent extract phase by evaporation of the solvent.

It is preferred to operate the process with the solutions in very fluid condition, so that equilibrium is reached rapidly, and there is no excessive foaming, emulsification, or occlusion of liquid by solid material.

The amount of calcium chloride present in the roasting mix is at least stoichiometrically equal to the total combined alkali in the ore, and preferably about 5 to 15% in excess thereof.

In the combination process, wherein high grade Portland cement clinker is obtained as a by-product, the mixture roasted in the cement kiln should be finely ground (e. g. through 200 mesh standard sieve, A. C. S. Year Book 1921–2) and provide a clinker having an average composition in percent by weight of 4 to 11% alumina and 19 to 26% silica, the remainder being substantially all calcium oxide except for only minor amounts of magnesia and iron oxide and the like. The weight ratio of silica to the sum of alumina and iron oxide therein is in the range of 1.7 to 2.7, preferably 2.4 to 2.7.

It is indeed surprising that high purity lithium chloride may be obtained in such an advantageous manner in accordance with the invention from crude aqueous chloride solutions containing lithium chloride together with a substantial concentration of sodium chloride or potassium chloride, or both; and especially that the combination process may be conducted in such an economically advantageous manner, whereby high grade cement clinker is obtained as a by-product, together with the high purity lower cost lithium chloride product.

Variations and modifications of the invention will be apparent to one skilled in the art in view of the foregoing disclosures, and it is intended to include within the invention all such variations and modifications except as do not come within the scope of the appended claims.

This application is a continuation-in-part of parent application Serial No. 103,303 which has issued as Patent No. 2,627,452, February 3, 1953.

I claim:

1. A process for the preparation of high purity lithium chloride from an aqueous solution containing at least about 2% by weight lithium chloride together with a substantial concentration of at least one other alkali metal chloride, said solution being obtained from lithium ore, which process comprises concentrating said solution by separation of water to 40 to 44% lithium chloride, separating any precipitated solid therein at 25 to 50° C., contacting the resulting solution with an inert relatively water insoluble polar organic compound containing 3 to 8 carbon atoms and at least one atom from the group consisting of nitrogen and oxygen in the molecule which compound is a selective solvent for lithium chloride, whereby there are formed a primary organic liquid extract phase and a primary liquid aqueous raffinate phase, both containing lithium chloride, separating the primary extract phase and recovering therefrom high purity lithium chloride by separation from the solvent.

2. A process of claim 1 wherein the organic compound is an alcohol.

3. A process of claim 2 wherein the alcohol is n-butanol.

4. A process of claim 2 wherein the alcohol is i-butanol.

5. A process of claim 2 wherein the alcohol is n-pentanol.

6. A process of claim 2 wherein the alcohol is i-pentanol.

7. A process of claim 1 wherein the primary extract phase is contacted with substantially pure water whereby there are formed a secondary liquid aqueous extract phase and a secondary organic liquid raffinate phase, separating the secondary aqueous extract phase and recovering therefrom the high purity lithium chloride.

8. A process of claim 7 wherein the organic compound is an alcohol.

9. A process of claim 8 wherein the alcohol is n-butanol.

10. A process of claim 8 wherein the alcohol is i-butanol.

11. A process of claim 8 wherein the alcohol is n-pentanol.

12. A process of claim 8 wherein the alcohol is i-pentanol.

13. A process of claim 1 wherein the lithium chloride solution is obtained by roasting beta-spodumene mixed with calcium carbonate and calcium chloride and forming a water solution of the soluble constituents of the gaseous material evolved thereby.

14. A process of claim 13 wherein the beta-spodumene is roasted with sand, calcium carbonate, and calcium chloride in proportions to form clinker having an average composition of 4 to 11% alumina and 19 to 26% silica, the remainder being substantially all calcium oxide together with minor amounts of magnesia and iron oxide, the weight ratio of silica to the sum of alumina and iron oxide therein being in the range of 1.7 to 2.7.

15. A process of claim 14 conducted in a continuous manner wherein sensible heat is removed from the gaseous material, and then the latter is contacted with the primary liquid aqueous raffinate phase, and any water insoluble solid material in the resulting mixture is separated and recycled to the roasting step.

16. A process of claim 15 wherein the organic compound is an alcohol and the primary extract phase is contacted with substantially pure water whereby there are formed a secondary liquid aqueous extract phase and a secondary liquid alcohol raffinate phase, separating said phases, recycling the secondary liquid alcohol raffinate to the initial alcohol extraction step, and recovering from the secondary aqueous extract phase the high purity lithium chloride.

17. A process of claim 16 wherein the alcohol is n-butanol.

18. A process of claim 16 wherein the alcohol is i-butanol.

References Cited in the file of this patent

UNITED STATES PATENTS

| 2,044,018 | Rossett et al. | June 16, 1936 |
| 2,413,644 | Nicholson | Dec. 31, 1946 |
| 2,561,439 | Erasmus | July 24, 1951 |

OTHER REFERENCES

Bureau of Mines (March 1946) R. T. 3848, pages 2 to 10.

Lea, F. M., and Desch, C. H.: "The Chemistry of Cement and Concrete," Edward Arnold and Co., London (1935), pages 21, 24, 124 and 125.